United States Patent
Otomo et al.

(10) Patent No.: US 9,529,549 B2
(45) Date of Patent: Dec. 27, 2016

(54) DATA PROCESSING METHOD FOR STORING DATA AND RESTORATION INFORMATION AND DATA PROCESSING SYSTEM

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Naoki Odate, Akiruno (JP); Takahisa Suzuki, Yokohama (JP); Hiromasa Yamauchi, Usakos (JP); Koji Kurihara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 125 days.

(21) Appl. No.: 14/134,675

(22) Filed: Dec. 19, 2013

(65) Prior Publication Data

US 2014/0108758 A1  Apr. 17, 2014

Related U.S. Application Data

(63) Continuation of application No. PCT/JP2011/064843, filed on Jun. 28, 2011.

(51) Int. Cl.
*G06F 12/00* (2006.01)
*G06F 3/06* (2006.01)
(Continued)

(52) U.S. Cl.
CPC ............ *G06F 3/065* (2013.01); *G06F 3/0604* (2013.01); *G06F 3/0683* (2013.01);
(Continued)

(58) Field of Classification Search
CPC ............ G06F 11/2035; G06F 11/2043; G06F 11/2097; G06F 3/0604; G06F 3/065;G06F 3/0683; G06F 11/1469; G06F 3/061; G06F 3/0614; H04L 67/1097
(Continued)

(56) References Cited

U.S. PATENT DOCUMENTS 5,742,843 A   4/1998  Koyanagi et al.
6,148,377 A  11/2000  Carter et al.
(Continued)

FOREIGN PATENT DOCUMENTS

JP   8-30568    2/1996
JP   10-254761  9/1998
(Continued)

OTHER PUBLICATIONS

International Search Report mailed Nov. 15, 2011, in corresponding International Application No. PCT/JP2011/064843.
(Continued)

*Primary Examiner* — Mardochee Chery
(74) *Attorney, Agent, or Firm* — Staas & Halsey LLP

(57) ABSTRACT

A data processing method that is executed by a first data processing apparatus included among plural data processing apparatuses, includes producing a copy of data, and restoration information that includes a first address of memory to which the copy of the data is stored; transmitting any one among the data and the copy of the data to a second data processing apparatus that is included among the data processing apparatuses; and storing the restoration information to shared memory that is memory of at least one data processing apparatus among the data processing apparatuses, and shared among the data processing apparatuses.

13 Claims, 15 Drawing Sheets

(51) Int. Cl.
    *H04L 29/08* (2006.01)
    *G06F 11/14* (2006.01)
    *G06F 11/20* (2006.01)
(52) U.S. Cl.
    CPC ...... *G06F 11/2043* (2013.01); *G06F 11/2097* (2013.01); *G06F 3/061* (2013.01); *G06F 3/0614* (2013.01); *G06F 3/0685* (2013.01); *G06F 11/1464* (2013.01); *G06F 11/1469* (2013.01); *G06F 11/2035* (2013.01); *H04L 67/1097* (2013.01)
(58) Field of Classification Search
    USPC ........................................................ 711/162
    See application file for complete search history.

(56) References Cited

U.S. PATENT DOCUMENTS

| | | | | |
|---|---|---|---|---|
| 7,146,474 | B2* | 12/2006 | Nguyen | G06F 3/061 711/114 |
| 7,917,474 | B2* | 3/2011 | Passey | G06F 11/2094 707/655 |
| 8,607,010 | B2* | 12/2013 | Furuhashi | G06F 11/1076 711/162 |
| 2003/0009643 | A1* | 1/2003 | Arimilli | G06F 12/0813 711/155 |
| 2006/0265559 | A1* | 11/2006 | Ikegaya | G06F 11/2069 711/161 |
| 2007/0005707 | A1 | 1/2007 | Teodosiu et al. | |
| 2009/0287886 | A1* | 11/2009 | Karstens | G06F 9/44557 711/147 |
| 2012/0079221 | A1* | 3/2012 | Sivasubramanian | G06F 11/1456 711/162 |

FOREIGN PATENT DOCUMENTS

| | | |
|---|---|---|
| JP | 11-149403 | 6/1999 |
| JP | 2004-320194 | 11/2004 |
| JP | 2005-72772 A1 | 3/2005 |
| JP | 2008-15739 | 1/2008 |
| JP | 2008-276281 | 11/2008 |
| JP | 2009-500698 | 1/2009 |
| JP | 2010-225021 | 10/2010 |

OTHER PUBLICATIONS

PCT International Preliminary Report on Patentability mailed Jan. 16, 2014 in corresponding International Application No. PCT/JP2011/064843.

Office Action mailed Mar. 10, 2015 in corresponding Japanese Patent Application No. 2013-522399.

* cited by examiner

| TERMINAL IDENTIFIER | COMMUNICATION SPEED (Mbps) |
|---|---|
| 00:00:00:00:00:00 | 8 |
| FF:FF:FF:FF:FF:FF | 4 |

| DATA | | COPY | |
|---|---|---|---|
| TERMINAL IDENTIFIER | PHYSICAL MEMORY ADDRESS | TERMINAL IDENTIFIER | PHYSICAL MEMORY ADDRESS |
| 00:00:00:00:00:00 | 0x000000000 | AA:AA:AA:AA:AA:AA | 0x88888888 |
| 99:99:99:99:99:99 | 0x44444444 | FF:FF:FF:FF:FF:FF | 0xFFFFFFFF |
| ... | | | |

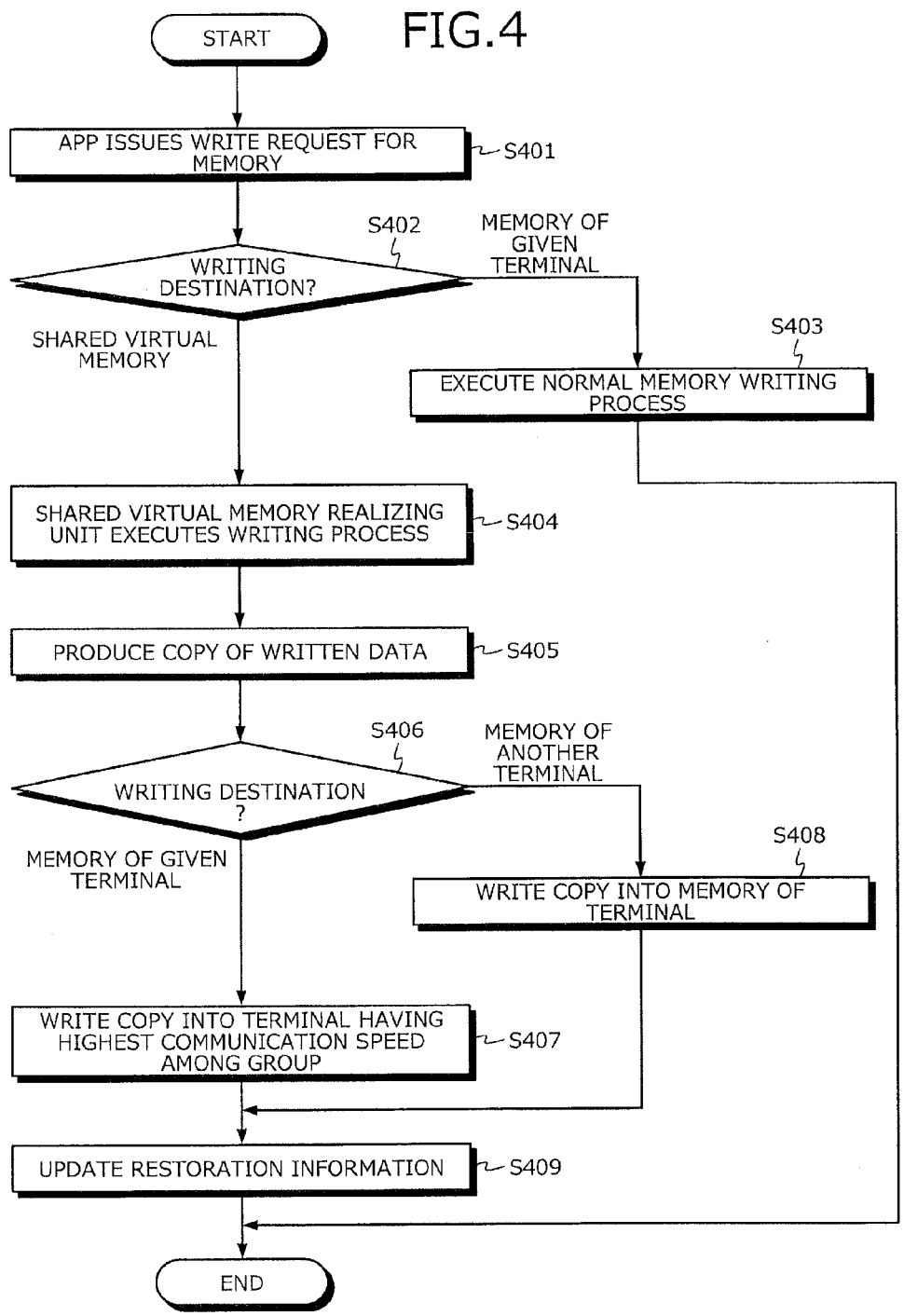

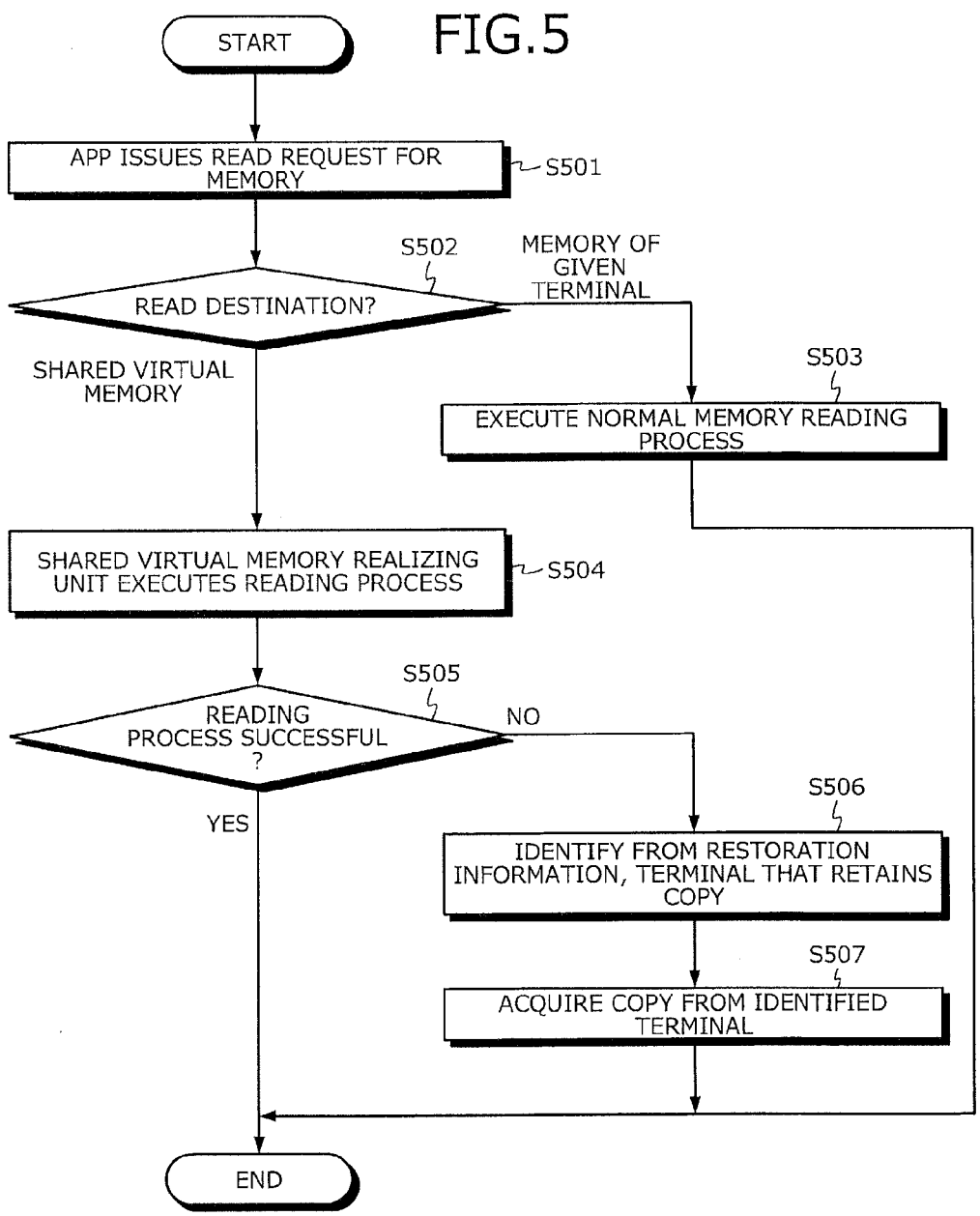

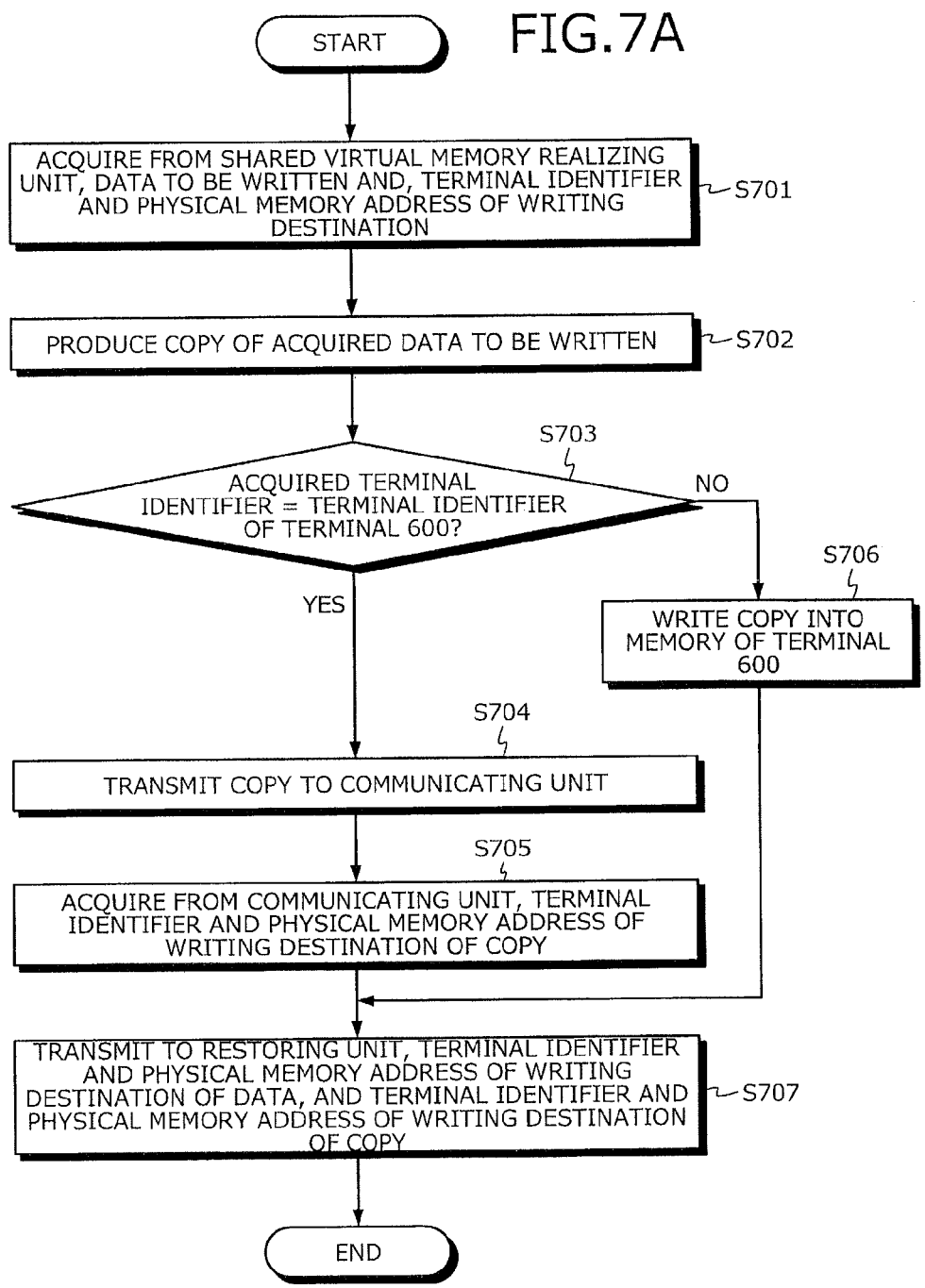

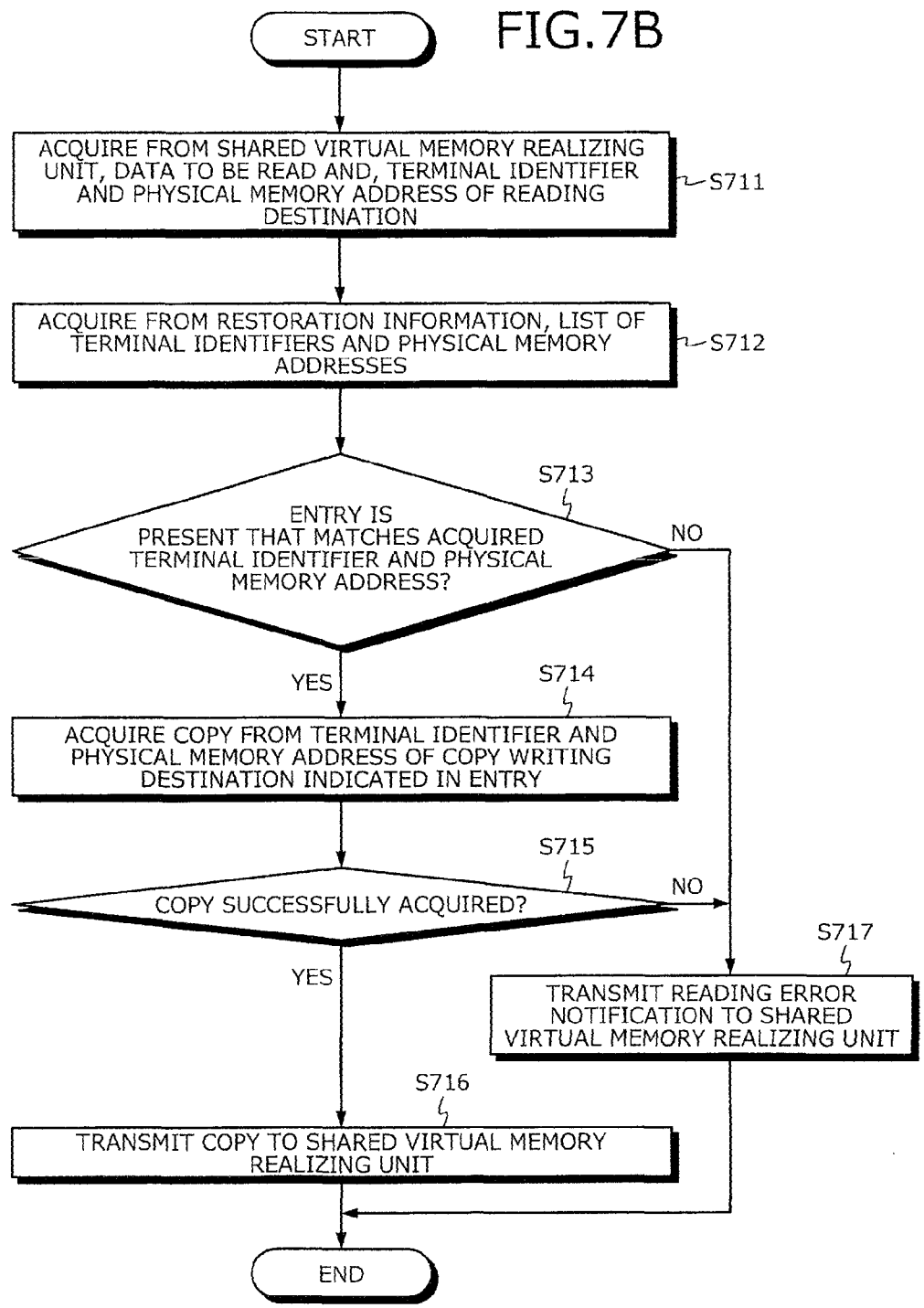

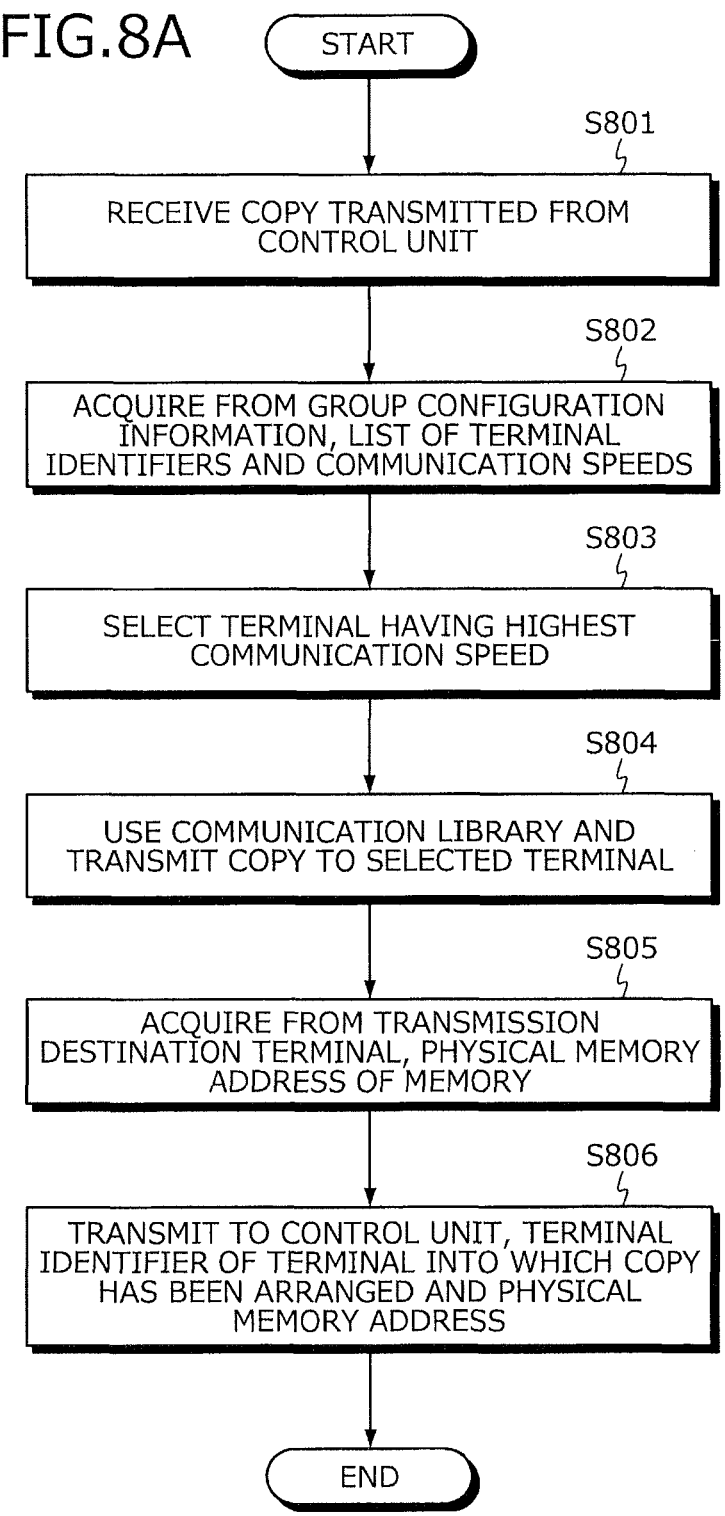

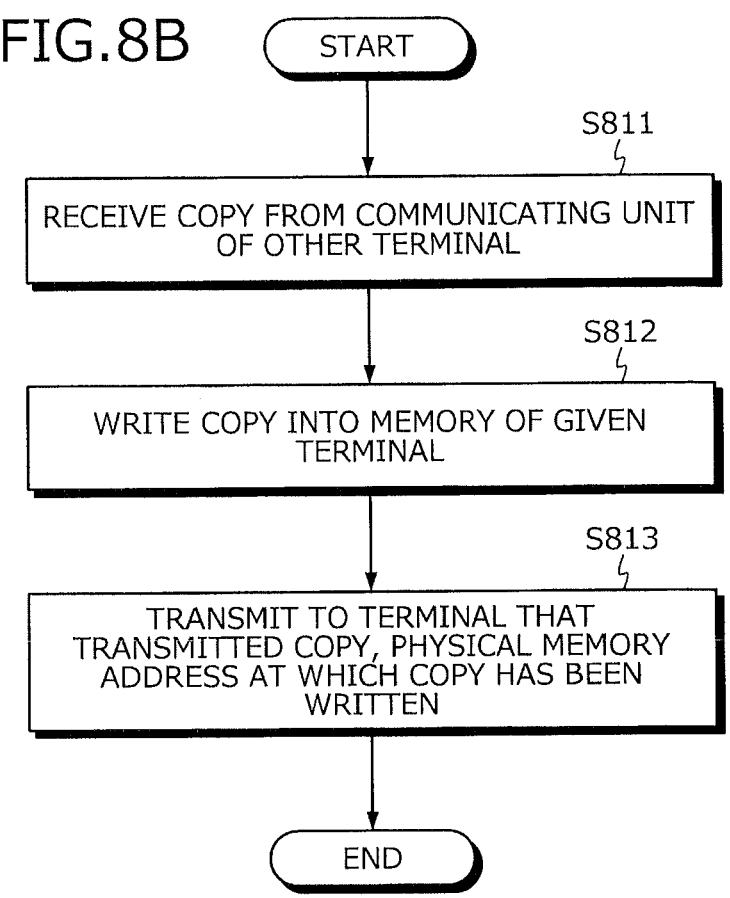

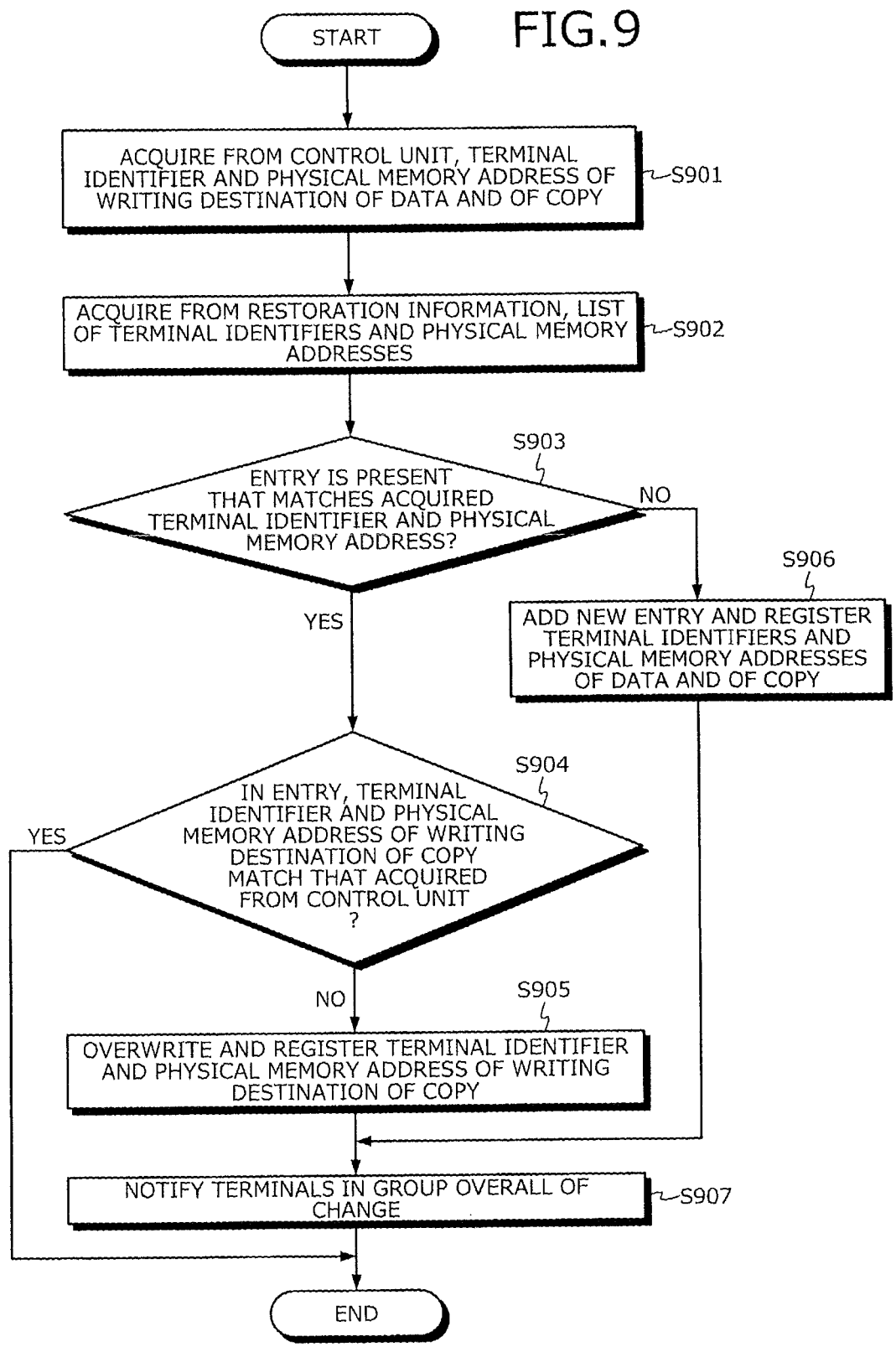

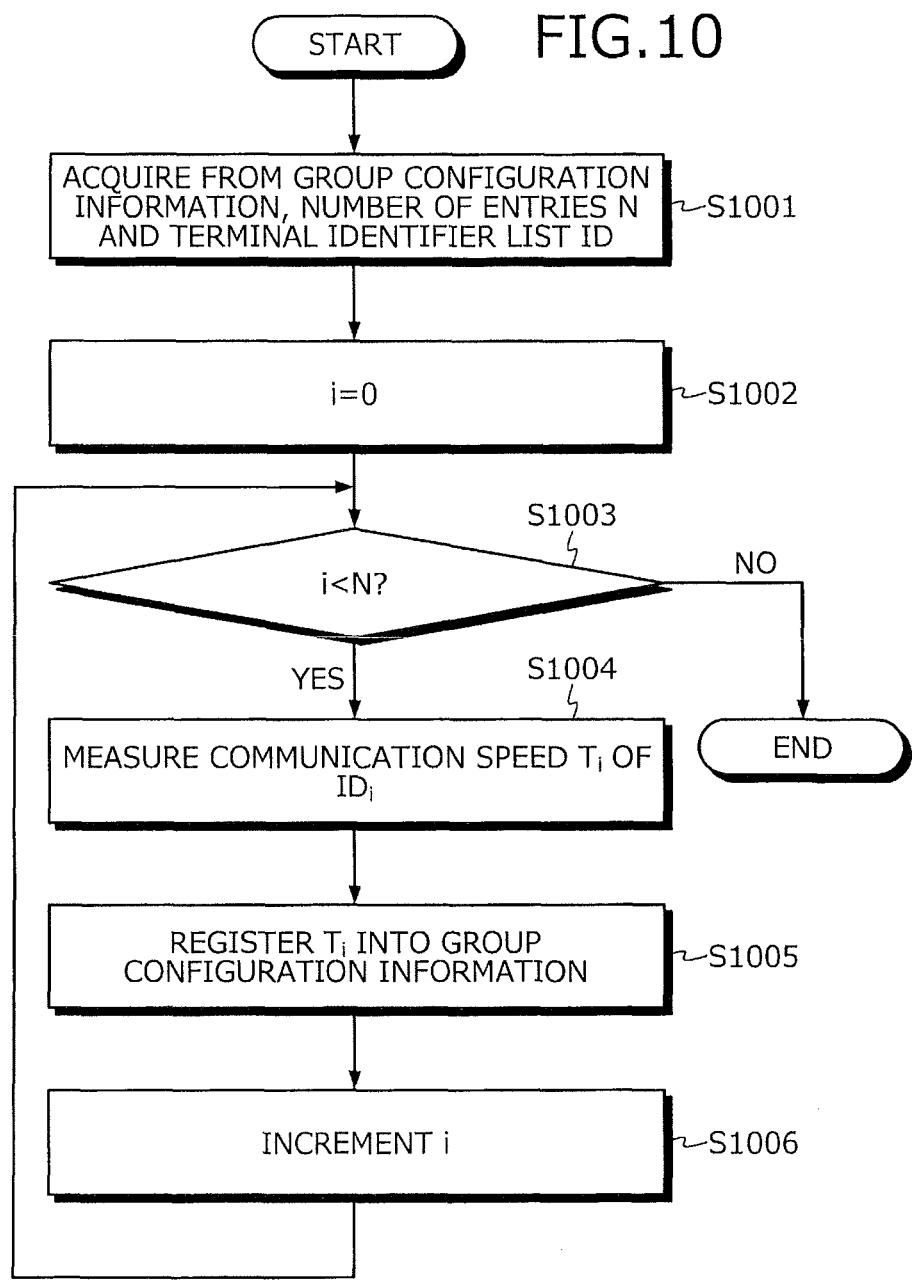

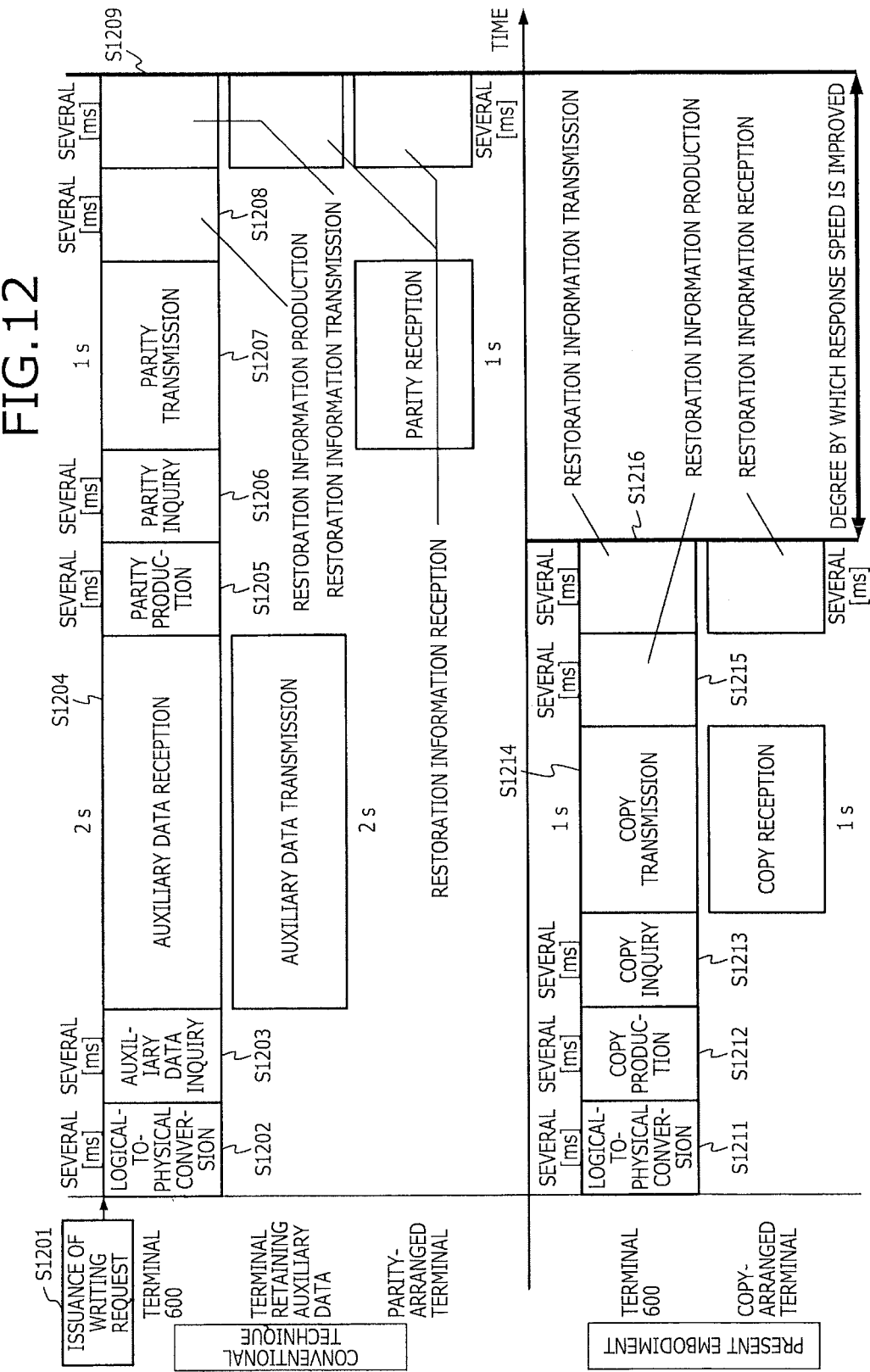

DATA PROCESSING METHOD FOR STORING DATA AND RESTORATION INFORMATION AND DATA PROCESSING SYSTEM

CROSS REFERENCE TO RELATED APPLICATIONS

This application is a continuation application of International Application PCT/JP2011/064843, filed on Jun. 28, 2011 and designating the U.S., the entire contents of which are incorporated herein by reference.

FIELD

The embodiments discussed herein are related to a data processing method and a data processing system that improves the reliability of shared virtual memory built among plural terminals and that efficiently restores the shared virtual memory.

BACKGROUND

According to a conventional technique, a shared virtual memory is built among plural terminals connected to each other by a network; and a virtual memory space is shared among the plural terminals (see, e.g., Japanese Laid-Open Patent Publication No. H10-254761). According to another disclosed technique, a table that includes data conversion equations according to terminal attribute and application type is prepared for sharing data among different types of terminals; and when a terminal transmits the shared data to another terminal, the terminal refers to the table, converts the shared data, and thereafter, transmits the converted data (see, e.g., Japanese Laid-Open Patent Publication No. H11-149403).

A data backup method has been disclosed that is used to share digital data among plural terminals respectively connected by a network (see, e.g., Japanese Laid-Open Patent Publication No. 2008-15739). According to this technique, a parity is produced by acquiring an exclusive OR of data "A" that is to be backed up and auxiliary data B retained at another terminal; and the parity is arranged in a terminal other than the terminals retaining the data A and the auxiliary data B. Thereby, even when the data A cannot be regenerated, the data A can be restored by acquiring the exclusive OR of the auxiliary data and the parity.

However, according to the techniques of Japanese Laid-Open Patent Publication Nos. H10-254761 and H11-149403, the data cannot be referred to when the connections among the terminals are disconnected consequent to a network fault, etc. and therefore, a problem arises in that the shared virtual memory is destroyed. With the backing up technique according to Japanese Laid-Open Patent Publication No. 2008-15739, the volume of the auxiliary data and the parity data to be transmitted for back up is great; a long time is consumed from an issuance of a write request to completion of all the processes; and therefore, the response performance of the backing up cannot be improved.

According to the techniques above, although the auxiliary data and the parity data are frequently transmitted and received through the network, the communication speed of the network is extremely low compared to the speed of the reading and writing of the memory in the terminal. Therefore, a long time is consumed for communication during the time period from the issuance of the write request to the completion of all the processes. Consequently, the realization of high response performance is difficult. Thus, when the shared virtual memory is destroyed, the restoration thereof consumes a great deal of time.

SUMMARY

According to an aspect of an embodiment, a data processing method that is executed by a first data processing apparatus included among plural data processing apparatuses, includes producing a copy of data, and restoration information that includes a first address of memory to which the copy of the data is stored; transmitting any one among the data and the copy of the data to a second data processing apparatus that is included among the data processing apparatuses; and storing the restoration information to shared memory that is memory of at least one data processing apparatus among the data processing apparatuses, and shared among the data processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A is a chart of an example of group configuration information;

FIG. 3B is a chart of an example of restoration information;

FIG. 4 is a flowchart of an operational process of writing data when shared virtual memory is built;

FIG. 5 is a flowchart of an operational process of reading data when the shared virtual memory is built;

FIG. 7A is a flowchart of a writing process executed by a control unit;

FIG. 7B is a flowchart of a reading process executed by the control unit;

FIG. 8A is a flowchart of a process executed by a communicating unit of a transmitting terminal;

FIG. 8B is a flowchart of a process executed by the communicating unit of the receiving terminal;

FIG. 9 is a flowchart of a process executed by the restoring unit;

FIG. 10 is a flowchart of a process executed by a communication speed monitoring unit;

FIG. 12 is a time chart of the processing time period when the data writing destination is the terminal executing the process.

DESCRIPTION OF EMBODIMENTS

According to the technique disclosed herein, data is shared among plural terminals and thereby, a shared virtual memory is formed. Redundancy information of the data is stored in any one of the terminals. In this case, a writing destination is selected for the redundancy information, based on the writing destination of the data. A copy of the data is used as the redundancy information to improve fault tolerance. In a case where the terminal writes the data into the shared virtual memory, when a real writing destination physical memory is a physical memory of another terminal, the terminal writes the copy into the terminal. When the writing destination is a physical memory of the terminal, the terminal writes the copy into the physical memory of the terminal capable of communicating with the terminal at the highest speed among the group. Thereby, the communication time period for transmitting and receiving the redundancy information is minimized for restoration of the data. The copy of the data is used as the redundancy information. With the use of the copy, a fault tolerance is presented that is higher than that with the use of the parity; no auxiliary data is necessary for producing the parity; the size of the copy is the same as that of the parity; and the communication amount that is necessary for producing the redundancy information is reduced.

Figure 1:
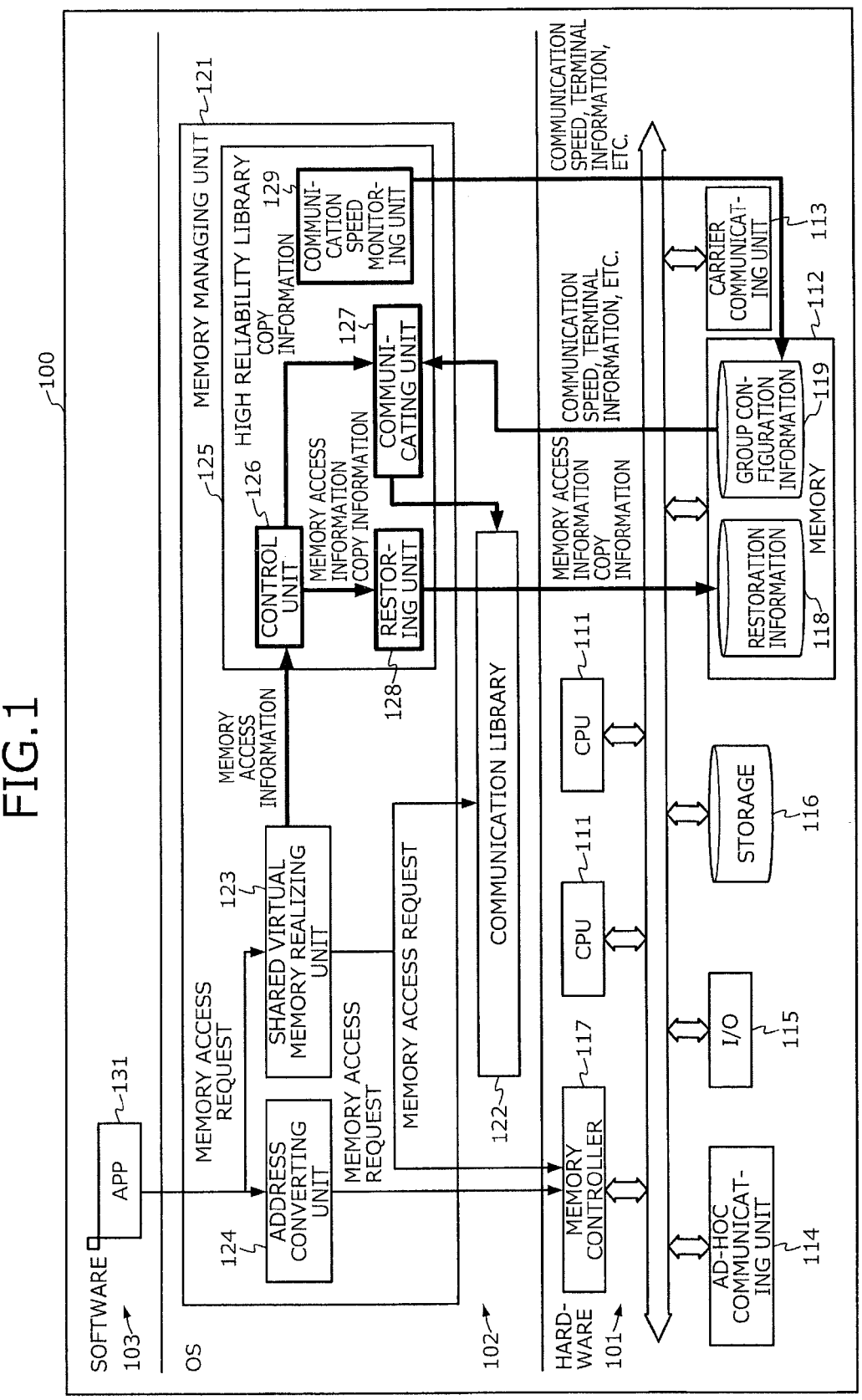
FIG. 1 is a block diagram of a configuration of a terminal apparatus included in a data processing system.

Embodiments will be described in detail with reference to the accompanying drawings. FIG. 1 is a block diagram of the configuration of a terminal apparatus included in a data processing system. In FIG. 1, a terminal apparatus (terminal) 100 is depicted as one among plural data processing apparatuses that configure a data processing system; and can be configured using, for example, a mobile telephone. The terminal apparatus 100 includes hardware 101, an operating system (OS) 102, and software 103. The hardware 101 includes a central processing unit (CPU) 111, memory 112, a carrier communicating unit 113, an ad-hoc communicating unit 114, an I/O 115, a storage 116, and a memory controller 117. The OS 102 includes a memory managing unit 121 and a communication library 122. The software 103 includes an application (app) 131 that executes a communication process.

The CPU 111 controls the processing of the overall terminal apparatus 100 and executes programs of the OS 102 (the memory managing unit 121 and the communication library 122) and the application 131 of the software 103. As depicted in FIG. 1, the terminal apparatus 100 may be configured to include plural CPUs 111 and execute parallel processing. The memory 112 is accessed by the CPU 111; forms shared virtual memory with the other plural terminals; and includes areas for restoration information 118 and group configuration information 119. The carrier communicating unit 113 communicates with the other terminals through a base station not depicted. The ad-hoc communicating unit 114 is used when the terminal apparatus 100 executes ad-hoc communication with another terminal apparatus 100. The I/O 115 is an interface for inputting and outputting data with respect to the terminal apparatus 100. The storage 116 is a storage medium such as flash memory.

The memory managing unit 121 of the OS 102 includes a shared virtual memory realizing unit 123, an address converting unit 124, and a high reliability library 125. The high reliability library 125 includes a control unit (control unit) 126, a communicating unit (communicating unit) 127, a restoring unit (restoring unit) 128, and a communication speed monitoring unit (communication speed monitoring unit) 129. The shared virtual memory formed using the plural terminals is managed by the virtual memory realizing unit 123.

The high reliability library 125 has a function of causing the shared virtual memory to have fault tolerance when the grouped plural terminals 100 build the shared virtual memory. When the high reliability library 125 acquires memory access information from the shared virtual memory realizing unit 123, the control unit 126 produces redundancy information for the fault tolerance and determines the arrangement destination thereof. When the arrangement destination of the redundancy information is another terminal 100, the communicating unit 127 selects an optimal terminal 100 as the arrangement destination and transmits the redundancy information thereto. The control unit 126 acquires the memory access information from the shared virtual memory realizing unit 123 and transmits to the communicating unit 127, information concerning a copy that is a duplicate of the data. The communicating unit 127 transmits to the restoring unit 128, information concerning the copy and memory access.

The communicating unit 127 acquires the information concerning the copy from the control unit 126 and acquires from the group configuration information 119, information concerning the plural terminals configuring the shared virtual memory and information concerning the communication speed of the terminal, etc. The communicating unit 127 transmits the copy that is the redundancy information of the data, to the other terminal using the communication library 122. The communication library 122 is a program group that implements communication among computers and communication among processes in one computer, and is normally included in the OS 102.

The restoring unit 128 produces as the restoration information 118, the position of the terminal 100 in which the redundancy information is present; shares the position with the terminals 100 of the group; and when the restoring unit 128 acquires from the control unit 126, the information concerning memory access and the copy, writes the acquired information into the restoration information 118. The communication speed monitoring unit 129 periodically acquires the speed of the communication with the terminals of the group and writes terminal information and the communication speeds into the group configuration information 119. An example where the high reliability library 125 is arranged in the memory managing unit 121 is taken as an example of the configuration depicted in FIG. 1. However, configuration is not limited hereto and the high reliability library 125 may be arranged outside the memory managing unit 121 provided that the high reliability library 125 is arranged inside the OS 102, and the high reliability library 125 and the memory managing unit 121 may mutually transmit and receive information therebetween.

Figure 2:
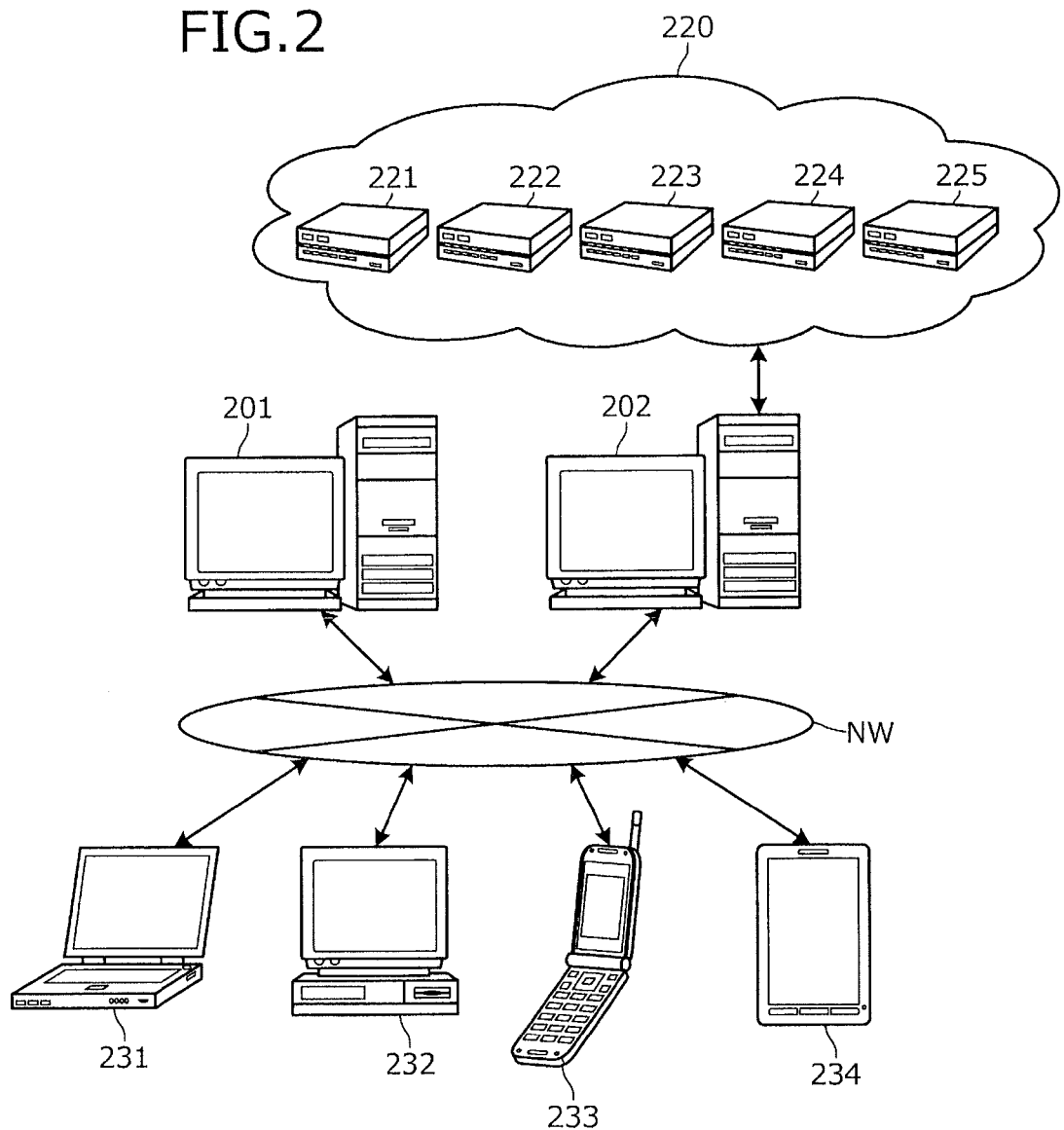
FIG. 2 is a diagram of an example of an application of a system using a computer depicted in FIG. 1.

FIG. 2 is a diagram of an example of an application of the system using the computer depicted in FIG. 1. In FIG. 2, a network NW is a network that includes servers 201 and 202, and clients 231 to 234 that can communicate with one another; and is configured by, for example, a local area network (LAN), a wide area network (WAN), the Internet, a mobile telephone network, and the like.

The server 202 is a management server of a server group (servers 221 to 225) configuring a cloud 220. Among the clients 231 to 234, the client 231 is a notebook personal computer; the client 232 is a desktop personal computer; the client 233 is a mobile telephone (that may be also be smartphone or a personal handy-phone system (PHS)); and the client 234 is a tablet terminal. The servers 201, 202, and 221 to 225, and the clients 231 to 234 are each implemented by, for example, the data processing apparatus depicted in FIG. 1.

FIG. 3A is a chart of an example of the group configuration information. The group configuration information 119 is used for building the shared virtual memory and is a correspondence table of the identifier of each of the terminals of the group and the speed of the communication with the terminal. Each of the terminals can be uniquely identified by the terminal identifier. The terminal identifier may be, for example, a MAC address as depicted. Alternatively, a SIM number, a telephone number, etc., may be used as the terminal identifier. The communication speed corresponds to the data amount that can be communicated between the terminals per unit time. Bits per second (bps) as depicted, etc., may be used as a unit therefor.

FIG. 3B is a chart of an example of the restoration information. The restoration information 118 is used to read a copy of data when the data is unreadable; and is a correspondence table for the terminal identifiers of the terminals that have the data and the copy written therein, and the physical memory addresses thereof. The "data" is the data actually handled for the shared virtual memory. The "copy" is a copy produced as the redundancy information of the data. The "physical memory address" refers to the address in the physical memory of each of the areas that actually retain the contents of the data and the copy.

FIG. 4 is a flowchart of an operational process of writing data when the shared virtual memory is built. When the application (app) 131 issues a write request for the memory 112 of a given terminal (step S401), the memory managing unit 121 determines whether the writing destination is the shared virtual memory (step S402). If the memory managing unit 121 determines that the writing destination is not the shared virtual memory (step S402: MEMORY OF TERMINAL), the memory managing unit 121 executes a normal memory writing process for the memory 112 of the given terminal (step S403) and causes the process to come to an end. On the other hand, if the memory managing unit 121 determines that the writing destination is the shared virtual memory (step S402: SHARED VIRTUAL MEMORY), the shared virtual memory realizing unit 123 executes a writing process for the shared virtual memory (the memory of another terminal), based on the memory access information (step S404).

Thereafter, when the shared virtual memory realizing unit 123 completes the writing process, the high reliability library 125 produces a copy of the written data (step S405) and determines whether the physical writing destination of the data is the given terminal (step S406). If the high reliability library 125 determines that the writing destination of the data is the given terminal (step S406: MEMORY OF GIVEN TERMINAL), the high reliability library 125 writes the copy into the terminal with which the speed of communication is the highest among the terminals of the group (step S407). On the other hand, if the high reliability library 125 determines that the writing destination is another terminal (step S406: MEMORY OF ANOTHER TERMINAL), the high reliability library 125 writes the copy into the given terminal (step S408). Thereafter, the high reliability library 125 updates the restoration information 118, reflecting on the restoration information 118, the written data and the location at which the copy is written (step S409) and causes the process to come to an end.

FIG. 5 is a flowchart of an operational process of reading data when the shared virtual memory is built. When an app issues a read request for the memory 112 of a given terminal (step S501), the memory managing unit 121 determines whether the read destination is the shared virtual memory (step S502). If the memory managing unit 121 determines that the read destination is not the shared virtual memory (step S502: MEMORY OF GIVEN TERMINAL), the memory managing unit 121 executes a normal memory reading process to read from the memory 112 of the given terminal (step S503). On the other hand, if the memory managing unit 121 determines that the read destination is the shared virtual memory (step S502: SHARED VIRTUAL MEMORY), the shared virtual memory realizing unit 123 executes a reading process for reading from the shared virtual memory, based on the memory access information (step S504).

Thereafter, when the shared virtual memory realizing unit 123 completes the reading process, the high reliability library 125 determines whether the reading process has been successfully executed (step S505). If the high reliability library 125 determines that the reading process has been successfully executed (step S505: YES), the high reliability library 125 executes no other operation and causes the process to come to an end. On the other hand, if the high reliability library 125 determines that the reading process has not been successfully executed (step S505: NO), the restoring unit 128 reads the restoration information 118, identifies the terminal that retains the copy that corresponds to the data that has not been successfully read (step S506), acquires the copy from the identified terminal (step S507), and causes the process to come to an end.

Figure 6B:
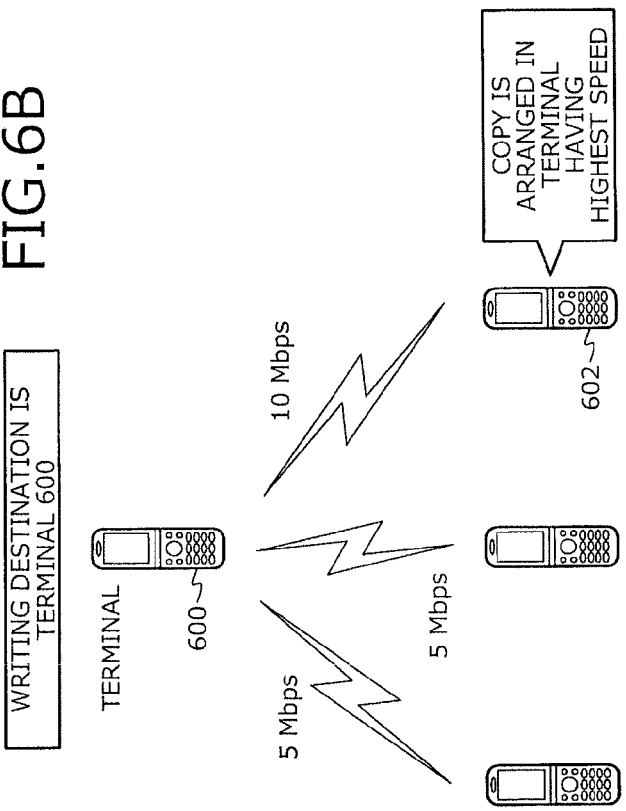
FIGS. 6A and 6B are explanatory diagrams of a writing destination of a copy of data.
Figure 6A:
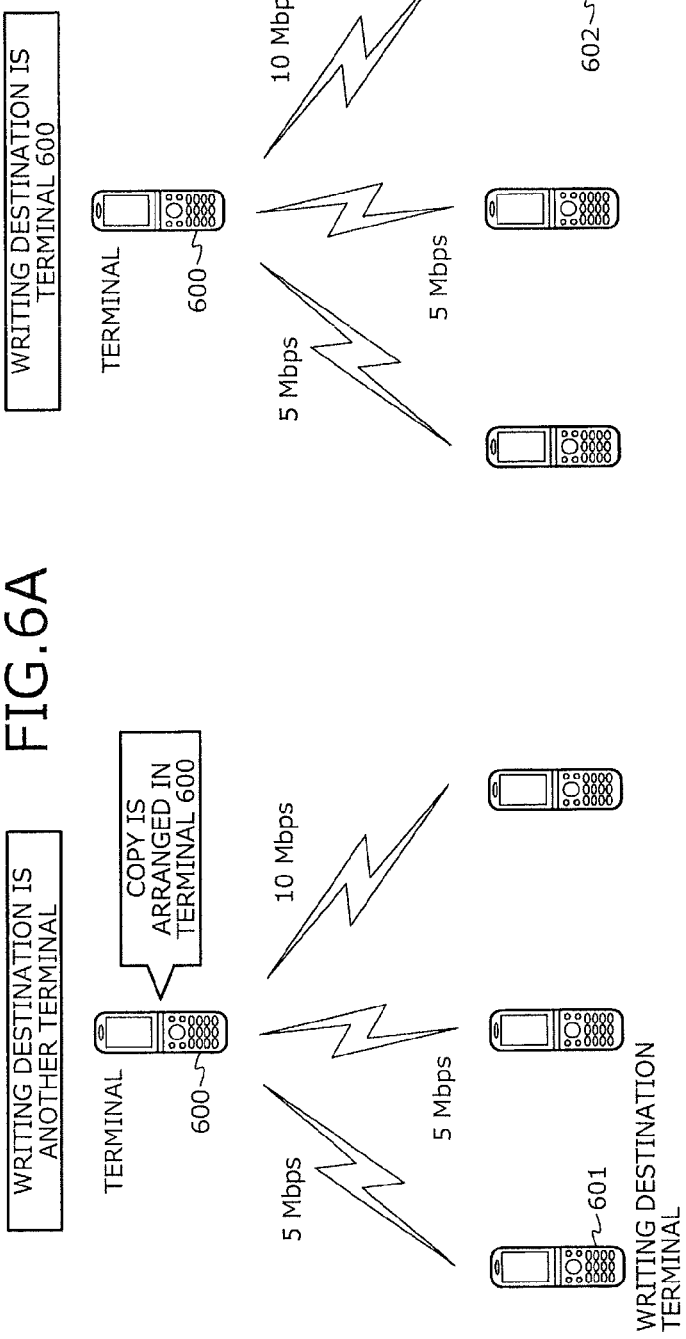

FIGS. 6A and 6B are explanatory diagrams of the writing destination of the copy of the data. In the writing process depicted in FIG. 4, in a case where the data is written into the shared virtual memory, (FIG. 6A) when the real writing destination physical memory is the memory 112 of another terminal 601, the copy is written into a terminal 600. On the other hand, (FIG. 6B) when the writing destination is the memory 112 of the terminal 600, the copy is written into the memory 112 of a terminal 602 that can communicate with the terminal 600 at the highest speed among the group.

FIG. 7A is a flowchart of a writing process executed by the control unit. The control unit 126 of the high reliability library 125 of the terminal 600 executes the process, triggered by the execution of the writing process of the shared virtual memory realizing unit 123. The control unit 126 acquires from the shared virtual memory realizing unit 123, the data to be written and, the terminal identifier and the physical memory address of the writing destination (step S701).

The control unit 126 produces a copy of the acquired data to be written (step S702) and thereafter, determines whether the acquired terminal identifier matches the terminal identifier of the terminal 600 (step S703). If the control unit 126 determines that the acquired terminal identifier matches the terminal identifier of the terminal 600 (step S703: YES), the control unit 126 transmits data of the copy to the communicating unit 127 (step S704), acquires the terminal identifier and the physical memory address of the writing destination of the copy (step S705), and progresses to the operation at step S707. If the control unit 126 determines that the acquired terminal identifier does not match the terminal identifier of the terminal 600 (step S703: NO), the control unit 126 writes the copy into the memory 112 of the terminal 600 (step S706) and progresses to the operation at step S707. At step S707, the control unit 126 transmits to the restoring unit 128, the terminal identifier and the physical memory address of the writing destination of the data, and the terminal identifier and the physical memory address of the writing destination of the copy (step S707), updates the restoration information 118, and causes the process to come to an end.

FIG. 7B is a flowchart of a reading process executed by the control unit. The control unit 126 executes the process, triggered by the execution of the reading process of the shared virtual memory realizing unit 123. The control unit 126 acquires from the shared virtual memory realizing unit 123, the data to be read and, the terminal identifier and the physical memory address of the reading destination (step S711).

The control unit 126 acquires a list of the terminal identifiers and the physical memory addresses from the restoration information 118 (step S712) and determines whether an entry is present in the list, that matches the terminal identifier and the physical memory address acquired from the shared virtual memory realizing unit 123 (step S713). If the control unit 126 determines that an entry is present that matches (step S713: YES), the control unit 126 acquires the copy from the indicated location (the terminal identifier and the physical memory address) having the copy that corresponds to the data (step S714) and determines whether the copy has been successfully acquired (step S715). If the control unit 126 determines that the copy has been successfully acquired (step S715: YES), the control unit 126 transmits the copy to the shared virtual memory realizing unit 123 (step S716) and causes the process to come to an end. If the control unit 126 determines that no matching entry is present (step S713: NO) or if the control unit 126 determines that the copy has not been unsuccessfully acquired (step S715: NO), the control unit 126 transmits to the shared virtual memory realizing unit 123, error notification giving notification of the unsuccessful reading (step S717) and causes the process to come to an end.

FIG. 8A is a flowchart of a process executed by the communicating unit of the transmitting terminal. The communicating unit 127 executes the process, triggered by the transmission of a copy of data by the control unit 126. When the communicating unit 127 receives the copy transmitted from the control unit 126 (step S801), the communicating unit 127 acquires from the group configuration information 119, a list of the terminal identifiers and the communication speeds (step S802), selects the terminal having the highest communication speed among the acquired list (step S803), uses the communication library 122 and transmits the data of the copy to the selected terminal (step S804), and thereafter, acquires from the transmission destination terminal, the physical memory address of the memory 112 into which the copy has been written (step S805), transmits to the control unit 126, the terminal identifier of the terminal into which the copy has been arranged and the acquired physical memory address (step S806), and causes the process to come to an end.

FIG. 8B is a flowchart of a process executed by the communicating unit of the receiving terminal. The communicating unit 127 of a given terminal executes the process, triggered by the transmission of a copy by another communicating unit 127 of another terminal. The communicating unit 127 receives the copy from the other communicating unit 127 of the other terminal (step S811), writes the received copy into the memory 112 of the given terminal (step S812); thereafter, transmits to the communicating unit 127 of the terminal that transmitted the copy, the physical memory address of the memory 112 into which the received copy has been written (step S813), and causes the process to come to an end.

FIG. 9 is a flowchart of a process executed by the restoring unit. The flowchart describes a process that is executed in advance to restore data. The restoring unit 128 executes the process, triggered by the transmission of a terminal identifier, etc., by the control unit 126. The restoring unit 128 acquires from the control unit 126, the terminal identifier and the physical memory address of the writing destination of the data and, the terminal identifier and the physical memory address of the writing destination of the copy (step S901); and acquires a list of the terminal identifiers and the physical memory addresses from the restoration information 118 (step S902).

Thereafter, the restoring unit 128 determines whether in the acquired list, an entry is present that matches the terminal identifier and the physical memory address acquired from the control unit 126 (step S903). If the restoring unit 128 determines that an entry is present that matches (step S903: YES), the restoring unit 128 determines whether the terminal identifier and the physical memory address of the writing destination of the copy included in the entry match the terminal identifier and the physical memory address of the writing destination of the copy acquired from the control unit 126 (step S904). If the restoring unit 128 determines that the terminal identifiers and the physical memory addresses respectively match (S904: YES), the restoring unit 128 executes no other operation and causes the process to come to an end. On the other hand, if the restoring unit 128 determines that the terminal identifiers and the physical memory addresses do not respectively match (S904: NO), the restoring unit 128 overwrites the entry, to register thereinto the terminal identifier and the physical memory address of the writing destination of the copy acquired from the control unit 126 (step S905) and progresses to the operation at step S907.

At step S903, if the restoring unit 128 determines that no entry is present that matches (step S903: NO), the restoring unit 128 additionally creates a new entry, and into the new entry, registers the terminal identifiers and the physical memory addresses of the data and of the copy acquired from the control unit 126 (step S906) and progresses to the operation at step S907. At step S907, the restoring unit 128 notifies the terminals overall in the group of the change (updating) of the entry (step S907) and causes the process to come to an end.

FIG. 10 is a flowchart of a process executed by the communication speed monitoring unit. The communication speed monitoring unit 129 periodically executes the following process. For example, the communication speed monitoring unit 129 may execute the process synchronized with a cycle for the terminal 100 to check the connection thereof with the base station at predetermined time intervals. The communication speed monitoring unit 129 acquires the number of entries N and a terminal identifier list ID from the group configuration information (step S1001) and measures the communication speed of each of the terminals in the list. For example, the communication speed monitoring unit 129 sets the number of terminals "i" to be an initial value of "zero" (step S1002). When the number of terminals i is less than the number of entries N (step S1003: YES), the communication speed monitoring unit 129 measures the communication speed Ti of one terminal (the terminal identifier list IDi) (step S1004). The measurement of the communication speed can be obtained using, for example, the time of transmission and the time of reception of a response thereto when data of a small amount (for example, data of 32 [Byte]) is actually transmitted to the terminal.

Thereafter, the communication speed monitoring unit 129 registers the measured communication speed of the terminal into the group configuration information 119 (step S1005), increments the number of terminals i (step S1006), and returns to the operation at step S1003. Thereafter, the communication speed monitoring unit 129 executes the operations at steps S1004 to S1006, and similarly executes the measurement and the registration of the communication speed for each of all the terminals in the group whose number of entries is N. When the measurement and registration of all the terminals in the group has been completed (step S1003: NO), the communication speed monitoring unit 129 causes the process to come to an end.

As depicted in FIG. 6, consideration will be given to the time period consumed for a data redundancy process in a case where four terminals are grouped and build the shared virtual memory. In the case depicted in FIG. 6, the terminal 600 is writing to the shared virtual memory. In this case, the shared virtual memory realizing unit 123 executes conversion from a virtual address to the terminal identifier and the physical address, and the terminal 600 writes the data according to the converted address of the terminal. In the following example, the size of the data is one [MByte]; the communication speeds are four [Mbps] between the terminal 600 and the writing destination terminal, and eight [Mbps] between the writing destination terminal and the terminal having the parity arranged therein; and other details are as depicted in FIG. 6.

Figure 11:
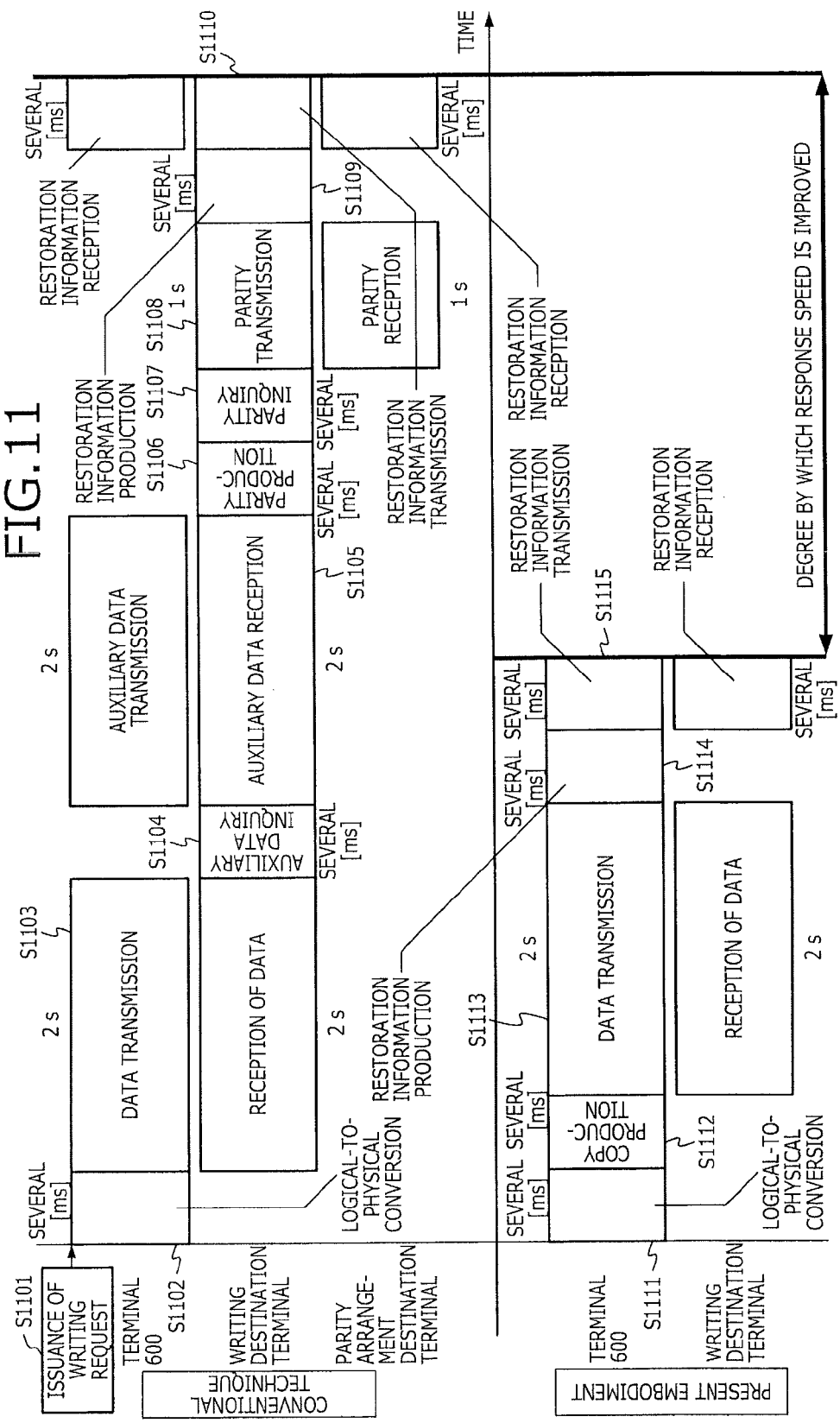
FIG. 11 is a time chart of a processing time period when the data writing destination is another terminal.

FIG. 11 is a time chart of the processing time period when the data writing destination is another terminal. A conventional technique, that is, a configuration of creating auxiliary data and transmitting the parity will be described first. According to the conventional technique, when a memory writing request is issued from the app (step S1101), the memory managing unit converts the virtual address to the physical address (logical-to-physical conversion) (step S1102). This "logical-to-physical conversion" is executed by referring to the correspondence table stored in the memory 112 of the terminal and therefore, the execution time period is about several hundred microseconds to about several milliseconds at most. When the terminal and the physical address of the writing destination are acquired by the logical-to-physical conversion, the terminal 600 transmits the data to the writing destination terminal (step S1103). The size of the data is one [MByte] and the communication speed between the terminal and the writing destination terminal is four [Mbps] and therefore, two [s] are necessary to transmit the data.

When the reception of the data comes to an end, the writing destination terminal makes an inquiry, concerning the auxiliary data, to the terminals in the group (step S1104). The content of the inquiry includes the amount of the necessary data, the terminal identifier, etc., and the amount of the generated communication is several kilobytes at most. Therefore, the auxiliary data inquiry time period is about several milliseconds. After the inquiring, the writing destination terminal receives the auxiliary data (step S1105). The size of the auxiliary data is at least one [MByte] and therefore, this reception consumes at least two [s]. When the reception of the auxiliary data comes to an end, the writing destination terminal produces the parity (step S1106). The parity is produced by acquiring the exclusive OR of the data and the auxiliary data, and thus, parity of at least one [MByte] is produced. Assuming that the operation frequency of the CPU is one [GHz], that the instruction per cycle (IPC) is one, and that data of four [Byte] can be handled for one command, the parity is produced in 250 microseconds and this becomes about several milliseconds when even the overhead caused by cache-miss, etc. is taken into consideration.

When the production of the parity has been completed, the writing destination terminal executes parity inquiry (step S1107). The parity inquiry is executed to search for a terminal that has available capacity to store the parity. The contents of the inquiry are substantially same as that of the auxiliary data inquiry and the inquiry time period is about several milliseconds. After the parity inquiry, the writing destination terminal transmits the parity to the parity arrangement destination terminal (step S1108). The size of the parity is one [MByte] and the communication speed between the writing destination terminal and the parity arrangement destination terminal is eight [Mbps]. Therefore, the time period consumed for transmitting the parity is one [s]. After the transmission of the parity, the writing destination terminal produces the restoration information (step S1109).

The restoration information is information that is used for the data to be restored from the auxiliary data and the parity when the data is not readable; and for example, is a correspondence table of the location of the data (such as the identifier of the terminal and the physical memory address) and the locations of the auxiliary data and the parity. Similar to the logical-to-physical conversion, the production of the restoration information is executed by referring to the memory 112 of the terminal and therefore, the time period for this is about several milliseconds. After the production of the restoration information, the writing destination terminal transmits the produced restoration information to all the terminals in the group (step S1110). The restoration information includes the locations of the data, the auxiliary data, and the parity and the size of each of these is about several kilobytes. Therefore, the time period consumed for transmitting the restoration information is on the order of several milliseconds similar to that of the auxiliary data inquiry. Thus, according to the conventional technique, the overall time period necessary for the data redundancy process is about 5.1 [s].

The data redundancy process according to the technique disclosed herein will be described. In the embodiment, when the memory writing request is issued from the app 131 (step S1101), the memory managing unit 121 executes the conversion from the virtual address to the physical address (logical-to-physical conversion) (step S1111). This is same as that of the conventional technique and the time period consumed for the logical-to-physical conversion is about several milliseconds. After the logical-to-physical conversion, the terminal 600 produces the copy (step S1112). The copy includes completely the same content as the data and the size thereof is one [MByte]. Therefore, similar to the production of the parity, the time period for producing the copy is about several hundred microseconds to several milliseconds. The copy produced in this case is stored to the memory 112 of the terminal 600.

After the production of the copy, the terminal 600 transmits the data to the writing destination terminal (step S1113). The size of the data is one [MByte] and the communication speed between the terminal 600 and the writing destination terminal is four [Mbps]. Therefore, two [s] are consumed for transmitting the data. After the transmission of the data, the terminal 600 produces the restoration information 118 (step S1114). The restoration information 118 is information that is for using the copy instead of the data when the data is not readable; and for example, is a correspondence table of the location of the data (such the identifier of the terminal and the physical memory address), and the location of the copy. Similar to the logical-to-physical conversion, the production of the restoration information is executed by referring to the memory 112 of the terminal and therefore, the time period consumed therefor is about several milliseconds.

After the production of the restoration information 118, the terminal 600 transmits the produced restoration information 118 to all the terminals in the group (step S1115). The restoration information 118 includes the locations of the data, the auxiliary data, and the parity, and is of a size that is about several kilobytes. Therefore, the time period consumed for transmitting the restoration information 118 is about several milliseconds similar to the case of the auxiliary data inquiry. Thus, according to the technique disclosed herein, the overall time period consumed for the data redundancy process is about 2.1 [s]. As described, according to the technique disclosed herein, the time period is merely half of 5.1 [s] that is necessary according to the conventional technique, or less.

FIG. 12 is a time chart of the processing time period when the data writing destination is the terminal executing the process. A conventional technique will be described first. According to the conventional technique, when a memory writing request is issued from the app (step S1201), the memory managing unit converts the virtual address to the physical address (logical-to-physical conversion) (step S1202). This "logical-to-physical conversion" is executed by referring to the correspondence table stored in the memory 112 of the terminal and therefore, the execution time period is about several hundred microseconds to about several milliseconds at most. When the terminal and the physical address of the writing destination are acquired by the logical-to-physical conversion, the terminal 600 makes an inquiry to the group of terminals concerning the auxiliary data (step S1203). The content of the inquiry includes the amount of the necessary data, the terminal identifier, etc., and the amount of the generated communication is several kilobytes at most. Therefore, the auxiliary data inquiry time period is about several milliseconds. After the inquiring, the terminal receives the auxiliary data (step S1204). The size of the auxiliary data is at least one [MByte] and therefore, this reception consumes at least two [s].

When the reception of the auxiliary data comes to an end, the terminal produces the parity (step S1205). The parity is produced by acquiring the exclusive OR of the data and the auxiliary data, and thus, parity of at least one [MByte] is produced. Assuming that the operation frequency of the CPU is one [GHz], that the instruction per cycle (IPC) is one, and that data of four [Byte] can be handled for one command, the parity is produced in 250 microseconds and this becomes about several milliseconds when even the overhead caused by cache-miss, etc. is taken into consideration. When the production of the parity has been completed, the terminal executes parity inquiry (step S1206). The parity inquiry is executed to search for a terminal that has available capacity to store the parity. The contents of the inquiry are substantially same as that of the auxiliary data inquiry and the inquiry time period is about several milliseconds.

After the parity inquiry, the terminal transmits the parity to the parity arrangement destination terminal (step S1207). The size of the parity is one [MByte] and the communication speed between the writing destination terminal and the parity arrangement destination terminal is eight [Mbps]. Therefore, the time period consumed for transmitting the parity is one [s]. After the transmission of the parity, the terminal produces the restoration information (step S1208). The restoration information is information that is used for the data to be restored from the auxiliary data and the parity when the data is not readable; and for example, is a correspondence table of the location of the data (such as the identifier of the terminal and the physical memory address) and the locations of the auxiliary data and the parity. Similar to the logical-to-physical conversion, the production of the restoration information is executed by referring to the memory 112 of another terminal and therefore, the time period for this is about several milliseconds. After the production of the restoration information, the terminal transmits the produced restoration information to all the terminals in the group (step S1209). The restoration information includes the locations of the data, the auxiliary data, and the parity and the size of each of these is about several kilobytes. Therefore, the time period consumed for transmitting the restoration information is on the order of several milliseconds similar to that of the auxiliary data inquiry. Thus, according to the conventional technique, the overall time period necessary for the data redundancy process is about 3.1 [s].

The data redundancy process according to the technique disclosed herein will be described. In the embodiment, when the memory writing request is issued from the app 131, the memory managing unit 121 executes the conversion from the virtual address to the physical address (logical-to-physical conversion) (step S1211). This is same as that of the conventional technique and the time period consumed for the logical-to-physical conversion is about several milliseconds. After the logical-to-physical conversion, the terminal produces the copy (step S1212). The copy includes completely the same content as the data and the size thereof is one [MByte]. Therefore, similar to the production of the parity, the time period for producing the copy is about several hundred microseconds to several milliseconds. The copy produced in this case is stored to the memory 112 of the terminal.

After the production of the copy, the terminal executes a copy inquiry (step S1213). The copy inquiry is executed to select a terminal suitable for the copy to be arranged in. The content of the inquiry is substantially same as that of the auxiliary data inquiry and the inquiry time period is about several milliseconds. After the copy inquiry, the terminal transmits the copy to the copy arrangement destination terminal (step S1214). The size of the copy is one [MByte] and the communication speed between the terminal 600 and the copy arrangement destination terminal is eight [Mbps]. Therefore, the time period necessary for the transmission of the copy is one [s].

After the transmission of the restoration data 118, the terminal produces the restoration information 118 (step S1215). The restoration information 118 is information that is for using the copy instead of the data when the data is not readable; and for example, is a correspondence table of the location of the data (such the identifier of the terminal and the physical memory address), and the location of the copy. Similar to the logical-to-physical conversion, the production of the restoration information 118 is executed by referring to the memory 112 of the terminal and therefore, the time period consumed therefor is about several milliseconds. After the production of the restoration information 118, the terminal transmits the produced restoration information to all the terminals in the group (step S1216). The restoration information 118 includes the locations of the data and the copy, and is of a size that is about several kilobytes. Therefore, the time period consumed for transmitting the restoration information 118 is about several milliseconds similar to the case of the auxiliary data inquiry. Thus, according to the technique disclosed herein, the overall time period consumed for the data redundancy process is about 1.1 [s]. As described, the time period is completed in one third the time according to the conventional technique.

According to the technique disclose as above, significant memory capacity can be acquired by building the shared virtual memory using the plural terminals. According to the disclosed technique, the plural terminals are configured to be connected to each other through the network and it is assumed that the connection to one terminal is unavailable due to the change of the network state. To cope with this, the copy of the data is produced in advance and the copy is arranged in a terminal that is different from the terminal that is to be the data writing destination. Thereby, even when a terminal becomes unable to be connected in the network, the data can be restored using the copy; the content of the data in the shared virtual memory can be maintained; and the reliability can be improved.

The configuration is such that the copy is to be written into the physical memory of a terminal with which the communication speed is the highest among the group, taking into consideration the communication speed of the network and therefore, the restoration of the data can be executed in a short time. The data is restored using the copy of the data and therefore, high fault tolerance can be acquired compared to that in a case where the parity is used; no auxiliary data is necessary for producing the parity; the communication amount can be reduced; and the data can efficiently be restored.

According to the data processing method and the data processing system disclosed herein, an effect is achieved that the reliability of the shared virtual memory built among the plural terminals is improved and the shared virtual memory is restored efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data processing method executed by a first data processing apparatus among a plurality of data processing apparatuses, the data processing method comprising:
   producing a copy of data, and restoration information that includes a first address of memory to which the copy of the data is stored;
   storing the copy of the data to a memory of the first data processing apparatus when a writing destination of the data is a memory other than the memory of the first data processing apparatus and transmitting the data to a second data processing apparatus among the plurality of data processing apparatuses;
   storing the copy of the data in a memory of the second data processing apparatus selected from among the plurality of data processing apparatuses based on communication speeds thereof when the writing destination of the data is the memory of the first data processing apparatus; and
   storing the restoration information to a shared memory that is memory of at least one data processing apparatus among the plurality of data processing apparatuses, and shared among the plurality of data processing apparatuses,
   wherein the restoration information further includes:
      a first identifier of the data processing apparatus comprising the memory that stores the copy of the data;
      a second identifier of the data processing apparatus comprising the memory that stores the data; and
      an address of the data stored in the memory.

2. The data processing method according to claim 1, further comprising
   storing the data to the memory of the first data processing apparatus.

3. The data processing method according to claim 1, further comprising
   storing the copy of the data to the memory of the first data processing apparatus, when the transmitting includes transmitting the data.

4. The data processing method according to claim 1, the data processing method further comprises updating an address of other restoration information to an address of the restoration information, when the second identifier, of the data processing apparatus comprising the memory that stores the data, in the restoration information matches an identifier in the other restoration information stored in the shared memory.

5. The data processing method according to claim 1, further comprising
   reading the copy of the data based on the restoration information stored in the shared memory, when an error occurs in reading the data.

6. The data processing method according to claim 1, further comprising
   measuring the communication speeds between the first data processing apparatus and each of the plurality of data processing apparatuses other than the first data processing apparatus.

7. A data processing system comprising
   a processor configured to function as:
      a control unit that functions in a first data processing apparatus among a plurality of data processing apparatuses, and produces a copy of data based on memory access information;
      a communicating unit that performs, based on the memory access information,
         storing the copy of the data to a memory of the first data processing apparatus when a writing destination of the data is a memory other than the memory of the first data processing apparatus and transmitting the data to a second data processing apparatus among the plurality of data processing apparatuses; and
         storing the copy of the data in a memory of the second data processing apparatus selected from among the plurality of data processing apparatuses based on communication speeds thereof when the writing destination of the data is the memory of the first data processing apparatus; and
      a restoring unit that produces restoration information that includes an address of memory that stores the copy of the data, and stores the restoration information to a shared memory shared among the plurality of data processing apparatuses,
   wherein the restoration information further includes:
      a first identifier of the data processing apparatus comprising the memory that stores the copy of the data;
      a second identifier of the data processing apparatus comprising the memory that stores the data; and
      an address of the data stored in the memory.

8. The data processing system according to claim 7, wherein
   the processor is further configured to function as a communication speed monitoring unit that acquires a communication speed of respective data processing apparatuses.

9. The data processing system according to claim 7, wherein
the communicating unit acquires the address from the second data processing apparatus and transmits the acquired address to the restoring unit.

10. The data processing system according to claim 7, wherein
the communicating unit transmits the copy of the data to the second data processing apparatus when the memory of the first data processing apparatus is accessed, and stores the copy of the data to the memory of the first data processing apparatus when memory of a data processing apparatus other than the first data processing apparatus is accessed.

11. The data processing system according to claim 7, the restoration unit updates an address of other restoration information to an address of the restoration information, when the second identifier, of the data processing apparatus comprising the memory that stores the data, in the restoration information matches an identifier in the other restoration information stored in the shared memory.

12. The data processing system according to claim 7, wherein
the communicating unit, when the copy of the data is transmitted, selects the second data processing apparatus from among the data processing apparatuses, based on communication speed.

13. The data processing system according to claim 7, wherein
the communicating unit measures the communication speeds between the first data processing apparatus and each of the plurality of data processing apparatuses other than the first data processing apparatus.

* * * * *